United States Patent [19]

Schmitz

[11] 4,131,162
[45] Dec. 26, 1978

[54] EARTH WORKING APPARATUS

[76] Inventor: James E. Schmitz, 5521 Le Juene Rd., Orlando, Fla. 32808

[21] Appl. No.: 639,884

[22] Filed: Dec. 11, 1975

[51] Int. Cl.² .................... A01B 63/16; A01B 15/16
[52] U.S. Cl. .................................. 172/138; 172/174; 172/462; 172/467; 172/421; 172/605; 172/500; 172/604; 172/244; 172/398
[58] Field of Search ............... 172/244, 574, 150, 398, 172/744, 605, 174, 68, 175, 59, 539, 462, 500, 421, 467

[56] References Cited

U.S. PATENT DOCUMENTS

| | | | |
|---|---|---|---|
| 628,363 | 7/1899 | Shoecraft | 172/150 |
| 1,248,673 | 12/1917 | Kochendorfer | 172/244 |
| 2,548,261 | 4/1951 | Hester | 172/574 |
| 2,882,622 | 4/1959 | Howard | 172/744 X |
| 3,111,174 | 11/1963 | Fry et al. | 172/244 |
| 3,815,266 | 6/1974 | Schmitz et al. | 172/175 X |
| 3,930,542 | 1/1976 | Van Der Lely et al. | 172/59 |

FOREIGN PATENT DOCUMENTS

10005 of 1894 United Kingdom ........................ 172/539

Primary Examiner—George J. Marlo
Attorney, Agent, or Firm—Mason, Fenwick & Lawrence

[57] ABSTRACT

An earth working apparatus comprising a main frame having a hitch for detachably connecting the apparatus to a prime mover, a first ground working implement mounted on the main frame, a pair of support arms operatively connected at forwardly disposed ends thereof to the main frame for pivotal movement about a first transverse axis, ground engaging wheels mounted on the support arm, a lift arm operatively connected to each of the support arms for pivotal movement about a second transverse axis, a second earthworking implement mounted on the lift arms, chains interconnecting each of the lift arms and the main frame, a ground engaging wheel mounted on one of the frames and hydraulic cylinders operatively interconnecting each of the support arms and the main frame for angularly displacing the support arms relative to the main frame whereby upon actuation of the hydraulic cylinders when the ground engaging wheel is not in engagement with the ground, the working implements will be caused to move into and out of engagement with the ground, and upon actuation of the hydraulic cylinders when the wheel is in engagement with the ground, which will be caused to move substantially vertically to permit the apparatus to be attached and detached from the prime mover. This invention relates to an earth working apparatus and more particularly to an earth working apparatus which may be converted into a condition both permitting and facilitating the transportation of the apparatus both on and off public highways from one working site to another.

22 Claims, 8 Drawing Figures

Fig-1

EARTH WORKING APPARATUS

In usual reforestation operations, it conventionally has been the practice to utilize different types of earth working equipment to remove stumps and larger debris, till and bed the soil and plant seedlings. Normally, reforestation sites are scattered which requires the transportation of such equipment from one working site to another, both on and off public highways. In the prior art, it often has been necessary with equipment of conventional design to transport such equipment on flatbed trailers and the like thus impairing operating efficiency and correspondingly increasing the cost of land clearing and reclaiming. It thus has been found to be desirable to provide an earth working apparatus which can be quickly and easily converted from an operative, earth working condition to an inoperative condition suitable for transporting the apparatus both on and off public highways from one working site to another.

Accordingly, it is the principal object of the present invention to provide a novel earth working apparatus.

Another object of the present invention is to provide a novel earth working apparatus which may be converted from an operative, earth working condition to an inoperative condition adapted to be transported from one working site to another.

A further object of the present invention is to provide a novel apparatus suitable for tilling soil in reforestration operations which can be converted from an operative, soil tilling condition to an inoperative condition suitable for transporting the apparatus both on and off public highways from one working site to another.

A still further object of the present invention is to provide a novel apparatus for bedding soil preparatory to planting in a reforestation operation which may be converted from an operative, bedding condition to an inoperative condition adapted to be transported both on and off public highways from one working site to another.

Another object of the present invention is to provide a novel apparatus for both tilling and bedding soil in a reforestation operation which may be converted from an operative, soil tilling and bedding condition to an inoperative condition adapted to transport the apparatus both on and off public highways from one working site to another.

A further object of the present invention is to provide an earth working apparatus suitable for use in reforestration operations which may be readily attached to and detached from a prime mover such as a tractor and the like, with a minimum amount of manual labor, thus minimizing the risk of injury to operating personnel.

A still further object of the present invention is to provide a novel apparatus for tilling and bedding soil in reforestation operations which is comparatively simple in design, is reliable in performance and requires a relatively minimum amount of maintenance.

An additional object of the present invention is to provide a novel coulter assembly suitable for use in an earth working apparatus.

Another object of the present invention is to provide a novel coulter assembly suitable for use in an earth working apparatus, in which the discs thereof may be replaced without disturbing or removing the bearings thereof and the bearings and the seals therefor are shielded from foreign matter.

Other objects and advantages of the present invention will become more apparent to those persons having ordinary skill in the art to which the invention pertains, from the following description taken in conjunction with the accompanying drawings, wherein:

Referring to the drawings, there is illustrated an embodiment of the invention consisting of an apparatus for tilling and bedding soil. Generally, the embodiment includes a main frame 10, a pair of support legs 11 and 12 mounted on the main frame, a pair of support arms 13 and 14 pivotally connected at the forward ends thereof to the main frame and provided at the rearward ends thereof with wheels 15 and 16, a leading coulter assembly 17 and a pair of trailing coulter assemblies 18 and 19 mounted on the main frame, a pair of lift arms 20 and 21 and a rolling or compacting drum 22 mounted on the rear ends of the lift arms.

Figure 1:
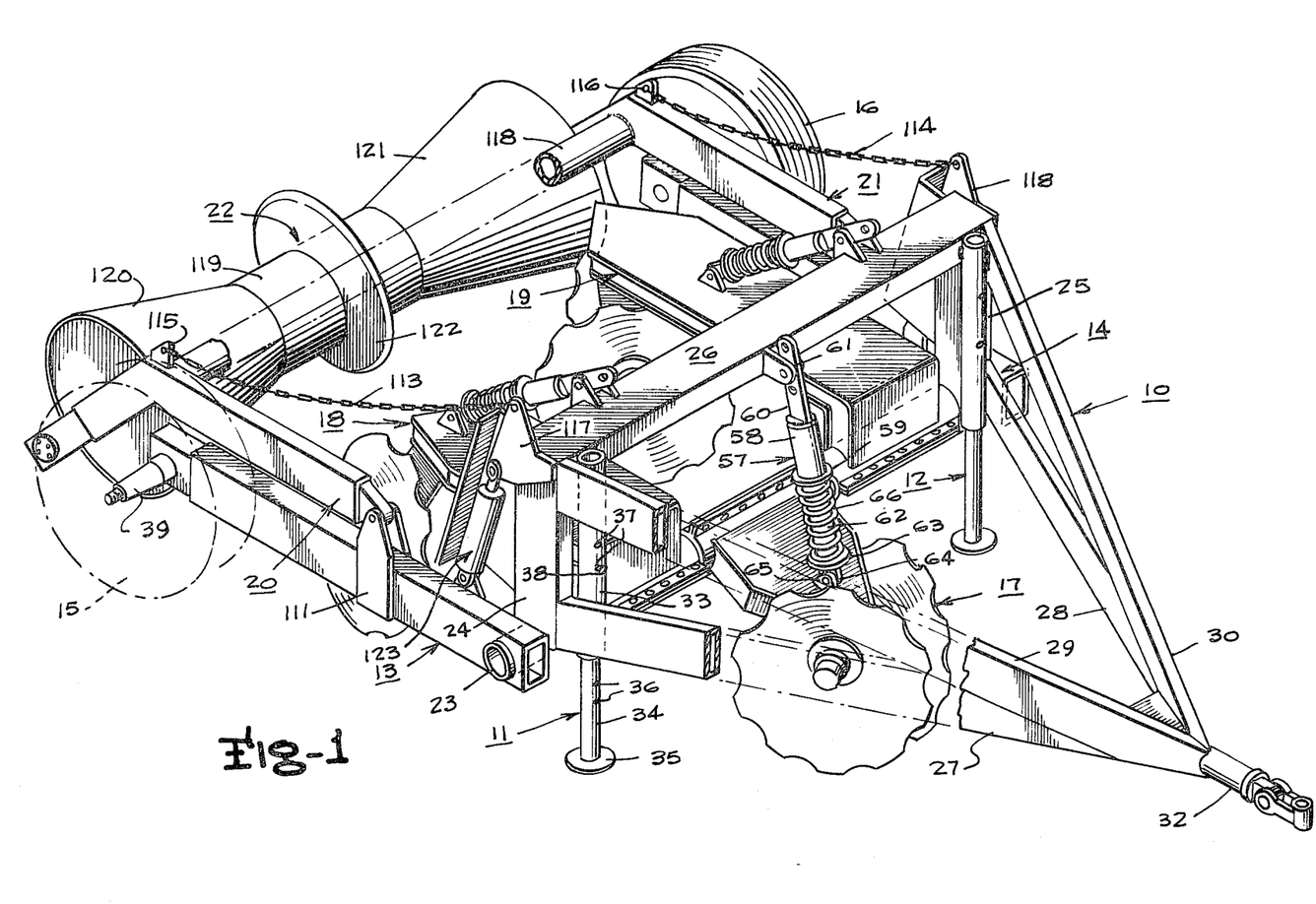
FIG. 1 is a perspective view of an embodiment of the invention, having portions thereof broken away or illustrated in phantom lines.
Figure 2:
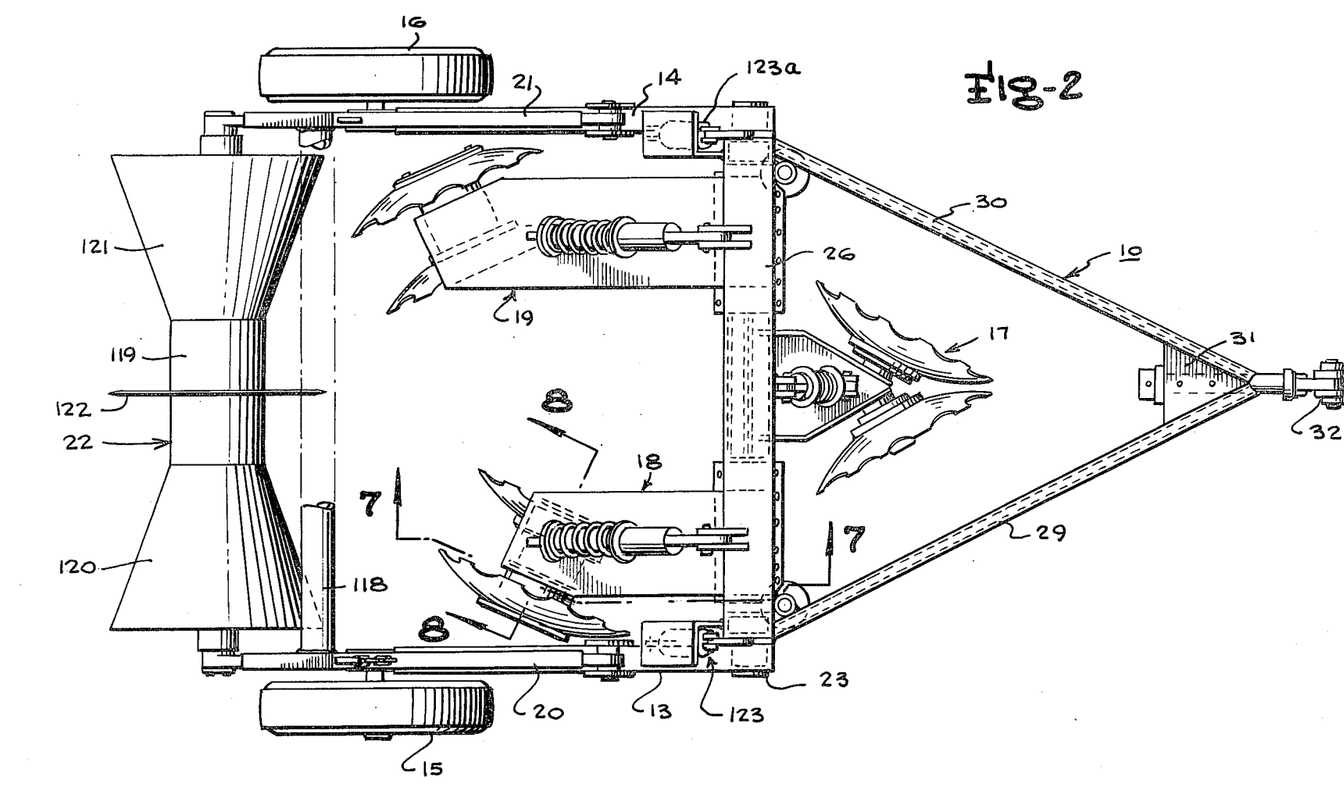
FIG. 2 is a top plan view of the embodiment illustrated in FIG. 1.
Figure 3:
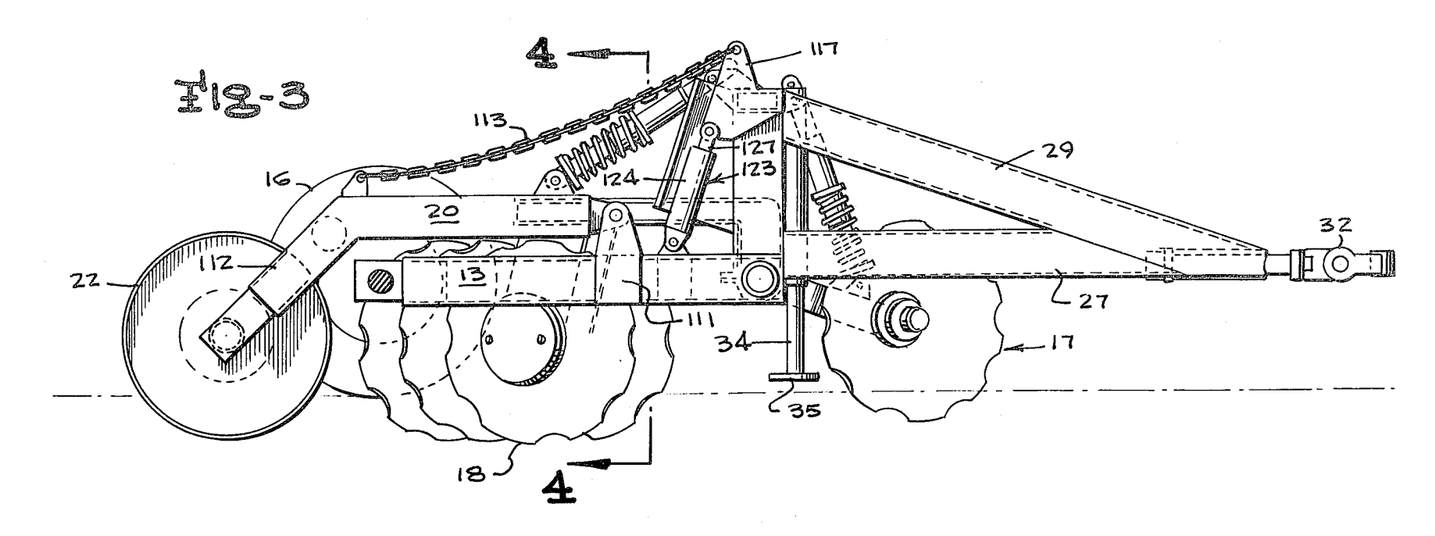
FIG. 3 is a side, elevational view of the embodiment illustrated in FIGS. 1 and 2.
Figure 4:
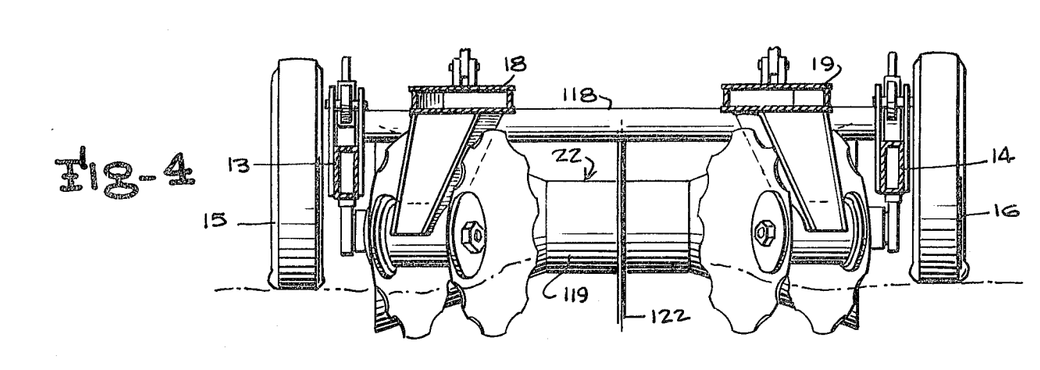
FIG. 4 is a cross-sectional view taken along lines 4—4 in FIG. 3.

Main frame 10 includes a transversely disposed tubular member 23, a pair of transversely spaced members 24 and 25 disposed substantially radially relative to the transverse axis of tubular member 23 and having the lower ends thereof rigidly secured to tubular member 23 inwardly from the ends thereof, and an upper crossbeam member 26 rigidly connected at the ends thereof to the upper ends of members 24 and 25. Rigidly secured to the lower ends of members 24 and 25 is a pair of forwardly projecting, converging drawbar members 27 and 28. Similarly, rigidly secured to the upper ends of members 24 and 25 is a pair of forwardly projecting, converging drawbar members 29 and 30. As best illustrated in FIGS. 1 through 3, drawbar members 27 through 30 merge and are joined together at a forwardly disposed point which is reinforced with a gusset plate 31. A conventional hitch 32 is mounted on the forward end of the drawbar members and gusset plate 31 for attaching the apparatus to a prime mover such as a conventional tractor or the like.

Figure 5:
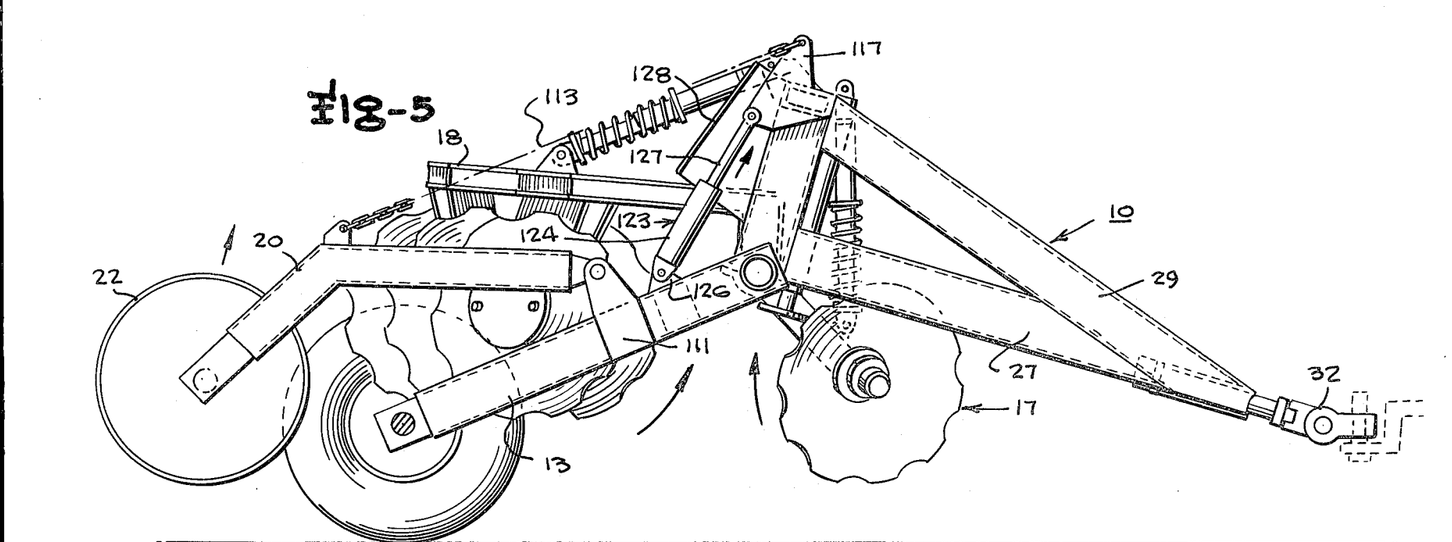
FIG. 5 is a view similar to the view of FIG. 3, illustrating the embodiment in an inoperative condition adapted to be transported both on and off public highways from one working site to another.

Support leg members 11 and 12 are substantially identical in construction. As best illustrated in FIG. 1, support leg member 11 consists of an upper tubular section 33 rigidly connected at the upper end thereof to crossbeam member 26 and upper and lower drawbar members 29 and 27, and a lower, tubular section 34 telescopically received in the lower end of upper leg section 33. Leg section 34 further is provided with a ground engaging pad 35 and a plurality of openings 36 which are adapted to register with appropriate openings 37 in the upper leg section to receive a retainer pin 38 for adjusting the length of the support leg either in a fully extended, ground engaging position as illustrated in FIG. 1 or a retracted position as illustrated in FIGS. 3 and 5.

Support arm members 13 and 14 also are similar in construction. As shown in FIGS. 1 and 3, support arm member 13 is pivotally mounted at the front end thereof on a laterally projecting end portion of tubular member 23, and the rearwardly disposed portion thereof is provided with a stub axle 39 on which wheel 15 is mounted in a conventional manner. It will be appreciated that the stub axles of support arm members 13 and 14 are disposable in transverse alignment and that wheels 15 and 16 are mounted thereon for supporting the rear end of the apparatus.

Figure 6:
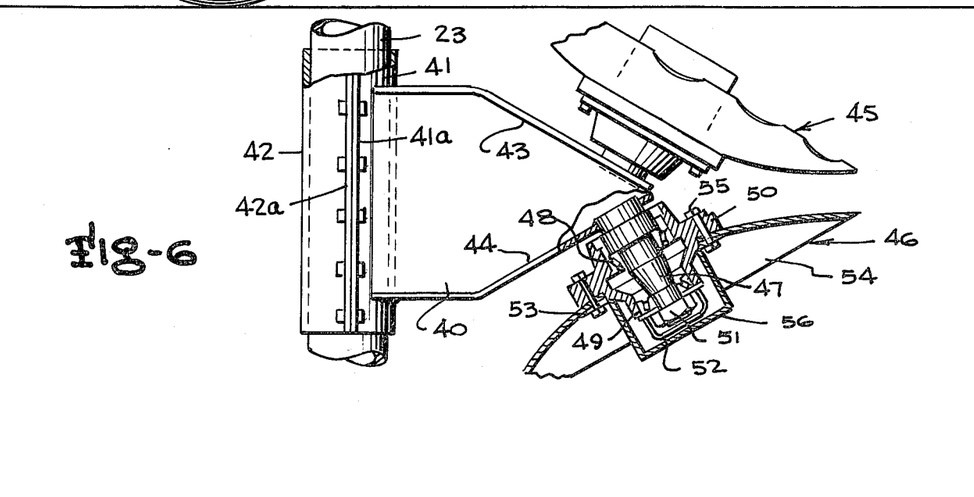
FIG. 6 is an enlarged top plan view of the leading coulter assembly illustrated in FIGS. 1 through 3 and 5, illustrating one of the coulters in horizontal cross-section.

Coulter assembly 17 is mounted on tubular member 23 of the main frame, along the longitudinal center line of the apparatus, and projects forwardly and downwardly therefrom. As best seen in FIGS. 1 and 6, the assembly is provided with a depending bracket 40 which is provided with an integral, semi-cylindrical section 41 and a detached semi-cylindrical section 42, provided with mating flanges 41a and 42a which may be bolted together to pivotally mount bracket 40 on tubular member 23. Bracket 40 is provided with a pair of converging side walls 43 and 44 on which there is mounted a pair of substantially identical coulter units 45 and 46. As best shown in FIG. 6, coulter unit 46 includes a stub shaft 47 having its axis disposed substantially normal to bracket side wall 44 and intersecting the axis of the stub shaft of coulter unit 45 substantially at the longitudinal center line of the coulter assembly, a pair of bearings 48 and 49 mounted on the stub shaft, a hub 50 mounted on the bearings, a nut 51 threaded on the end of the shaft for retaining the bearings and hub on the shaft, and a bearing cap 52. The hub is provided with a flange portion having an annular mounting surface 53 on which there is mounted a conventional disc 54. The disc is retained on hub 50 by means of a plurality of bolts 55 extending through aligned openings in an annular portion of a hub cap 56, disc 54 and the annular flange portion of hub 50.

It will be seen from the construction of the coulter unit as described, that disc 46 may be changed merely by removing bolts 55, and hub cap 56, and replacing the hub cap and bolts after the worn disc has been removed and replaced by a new disc. It further will be appreciated that during such replacement operation, bearings 48 and 49 would not have been exposed to any foreign matter as a result of being shielded by hub 50 and hub cap 52.

The downward pivotal movement of coulter assembly 17 is restricted by means of a yieldable stop assembly 57. Such assembly is best illustrated in FIG. 1 and consists of a cylindrical upper section 58 having a lower flange portion 59 and an upwardly projecting portion 60 pin connected to a clevis 61 mounted on the front end of crossbeam member 26, and a lower section 62 having the upper end thereof telescopically received within upper section 58, an annular flange 63 mounted adjacent the lower end thereof and a projecting portion 64 which is pin connected to a clevis 65 mounted on the upper side of coulter bracket 40. The upper end of lower section 62 is provided with suitable means for preventing the lower section from dropping out of the lower end of upper section 58. In addition, there is provided a spring 66 disposed on the exterior portion of lower section 62 between annular flanges 59 and 63 to urge the stop assembly into its fullest extended position. It further will be appreciated that the stop assembly restricts the downwardly pivotal movement of the coulter assembly while spring 66 permits the assembly to pivot upwardly against the biasing action of the spring as would be desired whenever the discs of the coulter unit engage an immoveable object in the ground while the apparatus is performing a tilling operation.

Figure 7:
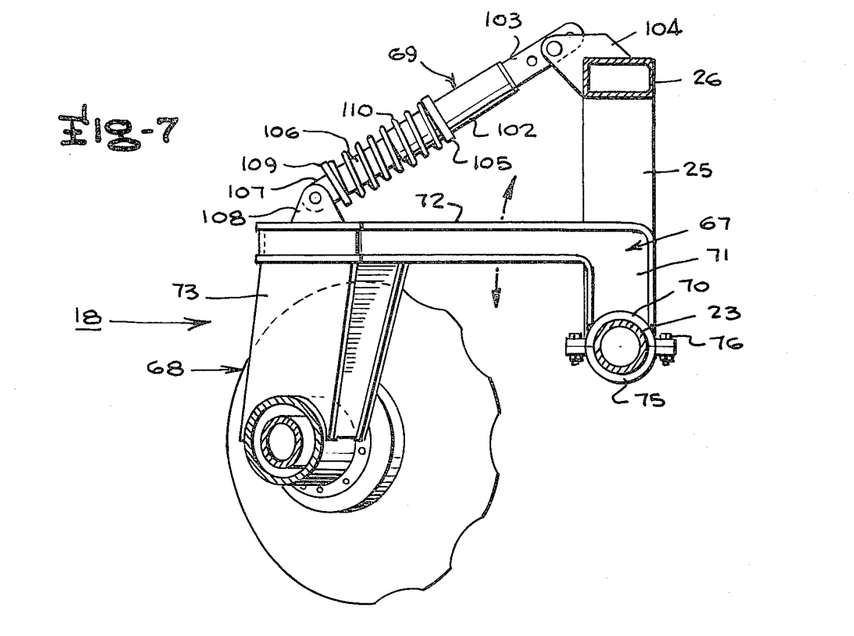
FIG. 7 is an enlarged cross-sectional view taken along lines 7—7 of FIG. 2.
Figure 8:
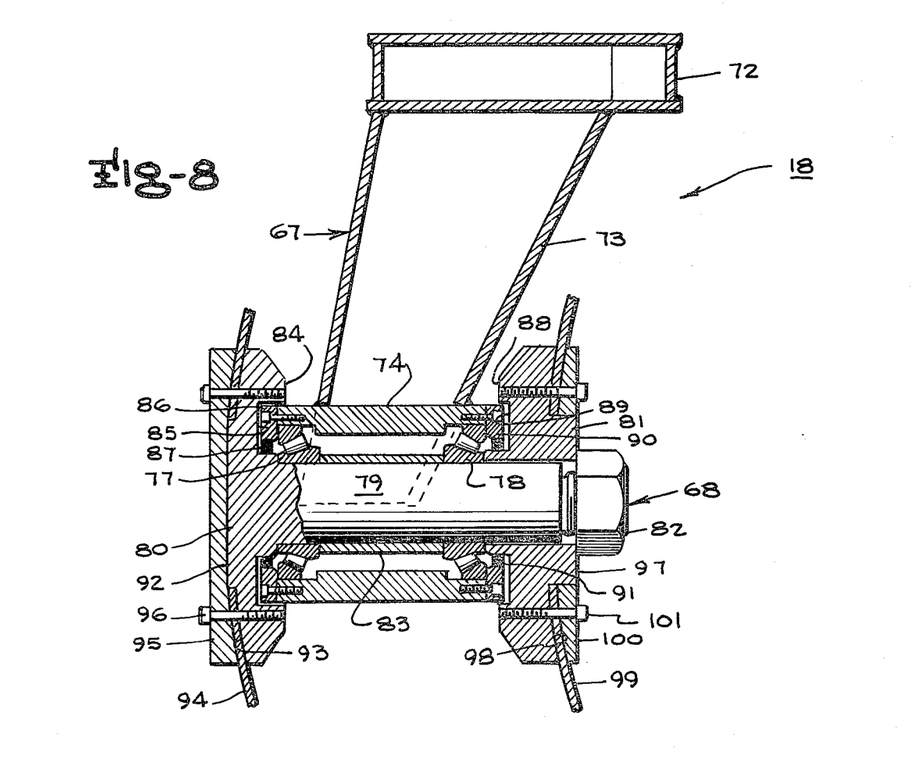
FIG. 8 is an enlarged cross-sectional view taken along lines 8—8 in FIG. 2.

As best illustrated in FIGS. 7 and 8, coulter assembly 18 generally consists of a support bracket 67, a coulter unit 68 and a yieldable stop assembly 69. Support bracket 67 includes a main section consisting of a semi-cylindrical portion 70 mounted on tubular member 23 adjacent frame member 24, a portion 71 disposed substantially radially relative to semi-cylindrical portion 70, an elongated arm portion 72 and a depending portion 73 having a cylindrical housing 74 at the end thereof. Bracket 67 also includes a detached, semi-cylindrical section 75 mounted on the underside of tubular member 23 and secured to portion 70 of bracket section 67 by means of a plurality of bolts 76 securing together mating flanges on bracket portion 70 and complementary bracket section 75. It will be noted that portion 72 of the support bracket projects rearwardly of the main frame of the apparatus and bracket portion 73 projects downwardly, and slightly rearwardly and outwardly. Also, the axis of housing 74 is disposed at an angle of about 25° relative to the transverse axis of tubular member 23.

Mounted in the ends of housing 74 is a pair of bearings 77 and 78 in which there is journaled a shaft 79. The shaft is formed integral at one end thereof with a hub 80 and is provided with a threaded portion at the opposite end thereof. Mounted on the free end of shaft portion 79 is a hub cap 81 which is secured in position by means of a nut 82 threaded on the end of the shaft and bearing against the outer surface of hub cap 81. Bearings 77 and 78 are maintained in spaced relation by means of a spacer 83 mounted on shaft portion 79 and engaging at the ends thereof, inner portions of the cone sections of the bearings.

Inner face 84 of hub 80 is provided with an annular recess 85 which is adapted to receive the outer end of shaft housing 74 and an annular bearing cap 86, when the coulter unit is in the assembled condition, providing a narrow labyrinth between the exterior of the unit and bearing 77. As illustrated in FIG. 8, a seal 87 is provided between bearing cap 86 and a radially inner wall of recess 85 thus sealing bearing 77 from the exterior of the unit. It will be appreciated that the combination of seal 87 and the narrow passageway provided by the labyrinth construction as described functions to prevent the entry of foreign matter from the exterior into the bearing area.

Similarly, inner surface 88 of hub 81 is provided with an annular recess 89 which is adapted to receive preferably the outer end of shaft housing 74 and at least a a bearing cap 90 mounted on the outer end of the shaft housing, when the coulter unit is in the assembled condition, providing a similar labyrinth construction. A seal 91 similarly is provided between bearing cap 90 and a radially inner wall of recess 89, functioning to prevent the entry into the bearing area of any foreign matter passing through the narrow passageway of the labyrinth construction.

The periphery of outer surface 92 of hub 80 is provided with an annular recess 93 on which there is seated a conventional coulter disc 94. The disc is secured in the seated position by means of a hub cap 95 mounted on outer surface 92 of hub 80 and the inner periphery of disc 94, and a plurality of bolts 96 passing through registered openings in the hub cap and disc, and threaded into registered openings in the hub. Similarly, outer surface 97 of hub 81 is provided about the periphery thereof with an annular recess 98 in which there is seated a conventional coulter disc 99. The disc is secured in position by means of an annular hub cap 100 and a plurality of bolts 101 passing through registered openings in hub cap 100 and disc 99, and threaded into registered openings in hub 81. It will be noted from FIG. 8 that coulter discs 94 and 99 have a concave or dish-like configuration and further that seating surfaces 93 and 98 are similarly configured to provide a full bearing surface for the discs. Similarly, the inner surfaces of hub caps 95 and 100 are configured to accommodate the surface configuration of the discs.

To assemble the coulter unit, bearing 77 is first inserted in the outer end of shaft housing 74 and bearing cap 86 with seal 87 provided thereon is mounted on the outer end of the shaft housing to secure bearing 77 in position. Shaft portion 79 is then inserted through bearing 77 and housing 74 so that the free end of the shaft projects beyond the outer end of housing 77 and a shoulder portion of hub 80 engages bearing 77. Spacer 83 is then placed on shaft 79 and positioned against the inner side of bearing 77. Bearing 78 is then mounted on shaft 79 and inserted in position within the outer end of housing 74. With bearing 78 thus positioned, bearing cap 90 with seal 91 is mounted on the outer end of shaft housing 74, engaging bearing 78. Hub 81 is then positioned on the outer end of shaft 79 so that an inner shoulder portion thereof engages the cone section of bearing 78. Nut 68 then is threaded on the free end of hub shaft 79 and tightened to urge hubs 80 and 81 toward each other. The assembly of the unit is completed by seating coulter disc 94 in recess 93 and securing it in position with hub cap 95 and bolts 96, and seating coulter disc 99 in recess 98 and securing it in position by means of hub cap 100 and bolts 101.

The construction of the coulter unit as described greatly facilitates the maintenance of the unit. In this regard, it will be noted that in order to inspect or replace seal 91 or bearing 78, it only is required to remove hub 81 and bearing cap 90. To additionally inspect or replace seal 87 or bearing 77, it further is necessary only to remove hub 80 and bearing cap 86. It further is to be noted that the replacement of discs 94 and 99 involves merely the removal of the respective hub cap and bolts and not the disassembly of the rest of the unit.

Stop assembly 69 shown in FIG. 7 is similar to previously described stop assembly 57. It is provided with an upper cylindrical section 102 having a connecting portion 103 pin connected to a bracket 104 mounted on crossbeam member 26, and a lower flange 105. The assembly further includes a tubular member 106 having the upper end thereof received within the lower end of cylindrical section 102, a lower connecting portion 107 pin connected to a clevis 108 mounted on the rearward end of support bracket 67 and an annular flange 109. The upper end of section 106 is provided with means for preventing the lower section from dropping out of the lower end of section 102. However, section 106 is urged into its fullest extended position by means of a spring 110 disposed on section 106 and the lower end of section 102 and engaging flanges 105 and 109.

From the construction of yieldable stop assembly 69, it will be noted that the downward pivotal movement of coulter assembly 18, about the transverse axis of tubular member 23, is restricted by the bottoming out of section 106 of the assembly. Furthermore, it will be noted that whenever coulter discs 94 and 99 may engage an immovable object during a tilling operation, the coulter assembly will be permitted to pivot upwardly about the transverse axis of tubular member 23, against the biasing action of spring 110. Once the immovable object has been passed, however, the biasing action of spring 110 will cause the coulter assembly to pivot downwardly thereby causing the desired ground penetration by the coulter discs.

Coulter assembly 19 is substantially similar in construction and operation to coulter assembly 18 with the minor exception of the support bracket having a greater length to more advantageously position the coulter units of the assemblies, as best shown in FIG. 2, to provide the desired tilling and bedding of the soil.

Lift arm 20 is connected at the forwardly disposed end thereof to a set of brackets 111 mounted on support arm 13 for pivotal movement about a transverse axis, in the vertical plane of movement of support arm 13. The rearwardly disposed end of lift arm 20 projects beyond the rear end of support arm 13 and downwardly as at 112. Lift arm 21 has a similar configuration and similarly is connected to support arm 14. Normally the forwardly disposed portions of lift arms 20 and 21 are adapted to be positioned above and substantially parallel to support arms 13 and 14 by means of a set of lift chains or cables 113 and 114 which are connected at their rearward ends to brackets 115 and 116 mounted on the lift arms and at their forwardly disposed ends to a set of brackets 117 and 118 mounted on the upper end of frame numbers 24 and 25. Interconnecting lift arms 20 and 21, intermediate the ends thereof is a tubular bracing member 118. It will be appreciated that bracing member 118 functions to cause lift arms 20 and 21 to be pivoted together about the transverse axis of their pivotal connection to support arms 13 and 14.

Rolling or compacting drum 120 is rotatably mounted on the rearward ends of the lift arms. The drum is provided with an intermediate, cylindrical surface 119 disposed substantially in longitudinal alingnment with coulter assembly 17, a pair of frusto-conically configured surfaces 120 and 121 disposed substantially in longitudinal alignment with coulter assemblies 18 and 19, respectfully, and a vertically disposed disc 122 lying along the longitudinal center line of the apparatus.

The angular displacement of support arms 13 and 14 relative to main frame 20, about the transverse axis of tubular member 23, can be effected by means of a pair of fluid actuated piston and cylinder assemblies 123 and 123a. As best shown in FIGS. 1, 3 and 5, assembly 123 consists of a cylinder pivotally connected at the lower end thereof to a bracket 126 mounted on support arm 13 and a piston 127 pivotally connected at the upper end thereof to bracket 117. The assembly is at least partially shielded from the soil and debris thrown by the action of coulter assemblies 18 and 19 by means of a plate member 128. Assembly 123a is best illustrated in FIG. 2 and is constructed and performs similarly to assembly 123. In the conventional manner, the opposite ends of the cylinders of both assemblies are connected by suitable fluid lines to a source of fluid under pressure on the prime mover. It is contemplated that such fluid lines would be provided with suitable couplings to permit the lines from being detached from the fluid system on the prime mover. It further will be appreciated that by the operation of suitable controls on the prime mover, fluid under pressure can be directed to opposite ends of the cylinders to extend and retract the pistons of assemblies 123 and 124 to displace support arms 13 and 14 relative to main frame 10.

Whenever the apparatus is in the condition as illustrated in FIGS. 1 and 3 and it is desired to either attach or detach the hitch from a prime mover, support legs 11 and 12 are adjusted in length so that the lower leg sections thereof are extended to engage the ground. Then, by operating suitable controls on the prime mover and either extending or retracting the pistons of assemblies 123 and 123a, hitch 32 may be caused to pivot about the points of engagment of the support leg members with the ground and move the hitch substantially vertically into and out of hitching relation with the prime mover. After the apparatus has been connected to a prime mover and it is desired to transport the apparatus to a working site, the lower sections of the support leg members are retracted and secured in position, and the controls on the prime mover are operated to extend the pistons of assemblies 123 and 123a. When such piston rods are extended, support arms 13 and 14 are displaced angularly relative to the main frame 10, causing the transverse axis of tubular member 23 to be raised and, correspondingly, coulter assemblies 17, 18 and 19 to be lifted out of engagement with the ground, as illustrated in FIG. 5. Simultaneously, as support arms 13 and 14 are displaced angularly relative to main frame 10, lift chains 113 and 114 will cause lift arms 20 and 21 to become angularly displaced relative to support arms 13 and 14 thus causing rolling drum 22 also to be lifted out of engagment with the ground.

With the apparatus in the inoperative condition as shown in FIG. 5, the apparatus principally is supported on wheels 15 and 16 and may be transported on and off public highways to a desired working site. Upon arrival at the working site and with the apparatus properly positioned to begin a tilling and bedding operation, the controls on the prime mover are operated to retract the pistons of the cylinder assemblies. As the pistons are retracted, coulter assemblies 17, 18 and 19 will be lowered to permit the coulter discs thereof to penetrate the ground. Simultaneously, rolling drum 22 will be lowered into a ground engaging position. Then, as the prime mover is advanced, leading coulter assembly 17 will operate to till the soil and directed it outwardly, trailing coulter assemblies 18 and 19 will till the soil and direct it inwardly toward the center of the apparatus, and the rolling drum will function to form and compact the tilled soil into a suitable bed, ready for a planter to follow and plant seedlings in the prepared bed of tilled soil, along the furrow formed by disc 122 of the rolling drum.

After the tilling and bedding operation has been completed and it again is desired to transport the apparatus to another working site, the controls on the prime mover again are operated to extend the piston rods of the cylinder assemblies thus causing the coulter assemblies and rolling drum to be lifted out of engagement with the ground, again principally supporting the apparatus on wheels 15 and 16. The prime mover then can be driven to the next working site. Alternatively, if it is desired to disconnect the apparatus from the prime mover, the lower sections of the leg support members merely are extended into ground engagement and the cylinder assemblies are operated to lift the hitch out of coupling engagement with the prime mover. After the apparatus has been uncoupled, it may be left supported on the support leg members until it is desired to couple the apparatus to a prime mover for transporting the apparatus or perhaps resuming a tilling and bedding operation.

From the foregoing detailed description, it will be evident that there are a number of changes, adaptations and modifications of the present invention which come within the province of those persons having ordinary skill in the art. However, it is intended that all such variations not departing from the spirit of the invention be considered as within the scope thereof and as limited solely by the appended claims.

I claim:

1. An earth working apparatus comprising a main frame, said main frame having means for detachably connecting said apparatus to a prime mover, at least one support frame having a ground engaging wheeled unit, operatively connected to said main frame for pivotal movement about a substantially transverse axis, a lift frame having a ground working implement mounted therein, operatively connected to said support frame for pivotal movement about a second substantially transverse axis, means operatively interconnecting said lift frame and said main frame for permitting said lift frame to be angularly displaced relative to said support frame when the ground working implement is in contact with the ground thereby permitting the ground working implement to follow the contour of the ground, and means operatively interconnecting said main frame and support frame for angularly displacing said main frame relative to said support frame whereby upon actuation of said displacing means said means interconnecting said lift frame and said main frame will function to angularly displace said lift frame relative to said support frame, correspondingly causing said earth working implement to be lifted out of a ground engaging position.

2. An earth working apparatus according to claim 1 wherein said means operatively interconnecting said lift frame and said main frame comprises a cable.

3. An earth working apparatus according to claim 1 wherein said displacing means comprises a fluid actuated piston and cylinder assembly.

4. An earth working apparatus according to claim 1 wherein said earth working implement comprises a rolling drum.

5. An earth working apparatus according to claim 1 wherein said main frame includes a section disposed substantially radially relative to the transverse axis of the pivotal connection between said main frame and said support frame and said displacing means comprises a fluid actuated piston and cylinder assembly operatively interconnecting said support frame and said radially disposed section of said main frame.

6. An earth working apparatus according to claim 5 wherein said means interconnecting said main frame and said lift frame is connected to said section of said main frame.

7. An earth working apparatus according to claim 1 including at least a second earth working implement mounted on said main frame which is caused to move into and out of engagement with the ground when said displacing means is actuated.

8. An earth working apparatus according to claim 7 wherein said second earth working implement comprises a coulter.

9. An earth working apparatus according to claim 1 including a leading coulter mounted on said main frame along the longitudinal center line thereof and a pair of trailing coulters, each mounted on said main frame and disposed laterally of the longitudinal center line of the main frame.

10. An apparatus according to claim 9 wherein said earth working implement mounted on said lift frame comprises a rolling drum.

11. An earth working apparatus according to claim 1 including a leading coulter mounted on said main frame along the longitudinal center line thereof and a pair of trailing coulters, each mounted on said main frame and disposed laterally of the longitudinal center line of the main frame, and wherein said earth working implement comprises a rolling drum having an intermediate cylindrical portion provided with a disc disposed substantially in longitudinal alignment with said leading coulter, and frusto-conically configured portions disposed substantially in longitudinal alignment with said trailing coulters.

12. An earth working apparatus comprising a main frame having means for detachably connecting said apparatus to a prime mover, a pair of support arms operatively connected to forwardly disposed ends thereof to said main frame for pivotal movement about a transverse axis, ground engaging wheels mounted on said support arms, a lift arm operatively connected to each of said support arms for pivotal movement about a second transverse axis, an earth working implement mounted on said lift arms, means interconnecting each of said lift arms and said main frame for permitting said lift frame to be angularly displaced relative to said support frame when the ground working implement is in contact with the ground thereby permitting the ground working implement to follow the contour of the ground, and means operatively interconnecting each of said support arms and said main frame for angularly displacing said support arms relative to said main frame whereby upon actuation of said displacing means said means interconnecting said lift arms and said main frame will function to angularly displace said lift arms relative to said support frames, correspondingly causing said earth working implement to be lifted out of a ground engaging position.

13. An earth working apparatus according to claim 12 wherein each of said means interconnecting each of said lift arms and said main frame comprises a cable.

14. An earth working apparatus according to claim 12 wherein each of said displacing means comprises a fluid actuated piston and cylinder assembly.

15. An earth working apparatus according to claim 12 wherein said earth working implement comprises a rolling drum.

16. An earth working apparatus according to claim 12 wherein said main frame includes a section disposed substantially radially relative to the transverse axis of the pivotal connection between said main frame and said support arms of each of said displacing means comprises a fluid actuated piston and cylinder assembly operatively interconnecting a support arm and said radially disposed section of said main frame.

17. An earth working apparatus according to claim 16 wherein each of said means interconnecting a lift arm and said main frame is connected to said section of said main frame.

18. An earth working apparatus according to claim 12 including at least a second earth working implement mounted on said main frame which is caused to move into and out of engagement with the ground when said displacing means is actuated.

19. An earth working apparatus according to claim 18 wherein said second earth working implement comprises a coulter.

20. An earth working apparatus according to claim 12 including a leading coulter mounted on said main frame along the longitudinal center line thereof and a pair of trailing coulters each mounted on said main frame and disposed laterally of the longitudinal center line of the main frame.

21. An earth working apparatus according to claim 20 wherein said earth working implement comprises a rolling drum.

22. An earth working apparatus according to claim 1 including means mounted on said main frame engageable selectively with the ground whereby upon engagement of said ground engaging means with the ground and actuation of said displacing means, said connecting means of said main frame will be caused to move substantially vertically to permit said connecting means to be attached and detached from said prime mover.

* * * * *